United States Patent
Yokono et al.

(10) Patent No.: US 6,697,711 B2
(45) Date of Patent: Feb. 24, 2004

(54) OPERATIONAL CONTROL METHOD, PROGRAM, AND RECORDING MEDIA FOR ROBOT DEVICE, AND ROBOT DEVICE

(75) Inventors: Jun Yokono, Tokyo (JP); Kohtaro Sabe, Tokyo (JP); Gabriel Costa, Tokyo (JP); Takeshi Ohashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/258,110

(22) PCT Filed: Feb. 21, 2002

(86) PCT No.: PCT/JP02/01573
§ 371 (c)(1),
(2), (4) Date: Oct. 18, 2002

(87) PCT Pub. No.: WO02/066211
PCT Pub. Date: Aug. 29, 2002

(65) Prior Publication Data
US 2003/0144764 A1 Jul. 31, 2003

(30) Foreign Application Priority Data
Feb. 21, 2001 (JP) .......................................... 2001-45691

(51) Int. Cl.[7] .............................................. G06F 19/00
(52) U.S. Cl. ...................... 700/245; 700/257; 700/259; 700/260; 700/262; 700/247; 700/249; 700/258; 382/153; 318/568.1
(58) Field of Search ............................... 700/245, 257, 700/260, 259, 262, 247, 249, 258; 318/568.1

(56) References Cited

U.S. PATENT DOCUMENTS

2002/0128822 A1 * 9/2002 Kahn ...................... 704/200.1
2002/0138175 A1 * 9/2002 Fujita et al. ................ 700/245
2003/0074107 A1 * 4/2003 Norma et al. ............... 700/245
2003/0078696 A1 * 4/2003 Sakamoto et al. .......... 700/245
2003/0130851 A1 * 7/2003 Nakakita et al. ............ 704/275
2003/0152261 A1 * 8/2003 Hiroe et al. ................ 382/153

FOREIGN PATENT DOCUMENTS

JP  11-077560  3/1999
JP  11-198075  7/1999

OTHER PUBLICATIONS

Conradt, Online-Learning In Humanoid Robots, 2000, Internet, pp. 1–105.*

* cited by examiner

Primary Examiner—William A. Cuchlinski, Jr.
Assistant Examiner—McDieunel Marc
(74) Attorney, Agent, or Firm—Frommer Lawrence & Haug LLP; William S. Frommer; Bruno Polito

(57) ABSTRACT

A robot apparatus (1) includes leg blocks (3A to 3D), head block (4), etc. as a moving part (16), a motion controller (102), learning unit (103), prediction unit (104) and a drive unit (105). When the moving part (106), any of the blocks, is operated from outside, the learning unit (103) learns a time-series signal generated due to the external operation. The motion controller (102) and drive unit (105) control together the moving part (106) based on a signal generated at the moving part (106) due to an external force applied to the robot apparatus (1) and a signal having already been learned by the learning unit (103) to make an action taught by the user. The prediction unit (105) predicts whether the moving part (106) makes the taught action according to the initial signal generated at the moving part (106) due to the applied external force. Thus, the robot apparatus (1) can learn an action taught by the user and determine an external force-caused signal to make the taught action.

14 Claims, 13 Drawing Sheets

| | INPUT EVENT NAME | DATA NAME | DATA RANGE | PROBABILITY OF TRANSITION TO OTHER NODE | | | | |
|---|---|---|---|---|---|---|---|---|
| | | | | A | B | C | D | n |
| DESTINATION NODE OF TRANSITION | | | | node 120 | node 120 | node 1000 | | node 600 |
| OUTPUT BEHAVIOR | | | | ACTION 1 | ACTION 2 | MOVE BACK | | ACTION 4 |
| 1 | BALL | SIZE | 0.1000 | 30% | | | | |
| 2 | PAT | | | | 40% | | | |
| 3 | HIT | | | | 20% | | | |
| 4 | MOTION | | | | | | | |
| 5 | OBSTACLE | DISTANCE | 0.100 | | | | | |
| 6 | | JOY | 50.100 | | | 50% | | |
| 7 | | SURPRISE | 50.100 | | | 100% | | |
| 8 | | SADNESS | 50.100 | | | | | | node 100

80

FIG.13

OPERATIONAL CONTROL METHOD, PROGRAM, AND RECORDING MEDIA FOR ROBOT DEVICE, AND ROBOT DEVICE

TECHNICAL FIELD

The present invention generally relates to a robot apparatus, method of, and program for, controlling the operation thereof, and a recording medium having the program recorded therein, and more particularly to a robot apparatus which can learn an action, robot apparatus-operation controlling method and program, by which the robot apparatus is allowed to learn an action, and a recording medium having the program recorded therein.

BACKGROUND ART

Recently, there are available robot apparatuses designed to have an appearance like a dog, cat or the like. Some of such robot apparatus autonomously behave according to external information and their internal state. A controller or the like is used to allow such a robot apparatus to learn a desired action. For example, a so-called joystick is used as the controller.

For allowing, by the controller or the like, the robot apparatus to learn an action, the user should be practiced to some extent. Further, a quadrupedal walking robot apparatus or the like has a more complicated link mechanism of the moving part and is thus more difficult to control.

Also, if the user can teach a robot apparatus kept like an actual pet animal an action in a more realistic manner as if he or she did it to an actual pet, he will has more fun.

DISCLOSURE OF THE INVENTION

Accordingly, the present invention has an object to overcome the above-mentioned drawbacks of the conventional robot apparatuses by providing a robot apparatus which can learn an action more easily and in a more realistic manner, a method of, and a program for, controlling the operation of the robot apparatus, and a recording medium having the program recorded therein.

The above object can be attained by providing a method of controlling the operation of a robot apparatus having a moving part, the method including, according to the present invention, steps of:

learning a time-series signal generated at the moving part correspondingly to an operation of the moving part; and controlling the moving part according to a signal generated, after the learning, at the moving part due to an external force applied to the moving part and the time-series signal learned in the learning step.

The above robot apparatus-operation controlling method allows the robot apparatus to learn an action made by the user onto the moving part, and thereafter autonomously behave recalling the action having thus been learned according to the external force applied to the moving part.

Also, the above object can be attained by providing a program for controlling the operation of a robot apparatus, the program allowing a robot apparatus according to the present invention to execute steps of:

learning a time-series signal generated at the moving part correspondingly to an operation of the moving part; and controlling the moving part according to a signal generated, after the learning, at the moving part due to an external force applied to the moving part and the time-series signal learned in the learning step.

The above program can allow the robot apparatus to learn a time-series signal generated at the moving part correspondingly to an operation of the moving part, and control thereafter the moving part according to a signal generated at the moving part due to an external force applied to the moving part and the time-series signal learned in the learning step. Thus, the robot apparatus autonomously behaves recalling the action having thus been learned according to the external force applied to the moving part.

Also, the above object can be attained by providing a recording medium having recorded therein a program for controlling the operation of the robot apparatus having a moving part, the medium allowing according to the present invention the robot apparatus to execute steps of:

learning a time-series signal generated at the moving part correspondingly to an operation of the moving part; and controlling the moving part according to a signal generated, after the learning, at the moving part due to an external force applied to the moving part and the time-series signal learned in the learning step.

The above program recorded in the recording medium allows the robot apparatus to learn an action made by the user onto the moving part, and thereafter autonomously behave recalling the action having thus been learned according to the external force applied to the moving part.

Also, the above object can be attained by providing a robot apparatus having a moving part, including according to the present invention:

means for learning a time-series signal generated at the moving part correspondingly to an operation of the moving part; and controlling the moving part according to a signal generated, after the learning, at the moving part due to an external force applied to the moving part and the time-series signal learned in the learning step.

The robot apparatus constructed as above can learn an action made by the user onto the moving part and thereafter autonomously behave recalling the action having thus been learned according to the external force applied to the moving part.

These objects and other objects, features and advantages of the present invention will become more apparent from the following detailed description of the best mode for carrying out the present invention when taken in conjunction with the accompanying drawings.

BRIEF DESCRIPTION OF THE DRAWINGS

FIG. 13 shows a state transition table prepared for each node of the finite probability automaton.

BEST MODE FOR CARRYING OUT THE INVENTION

It should be noted that the robot apparatus going to be described as an embodiment of the present invention is of an autonomous type which autonomously behaves adaptively to its surrounding environment (external factor) and internal state (internal factor).

Figure 1:
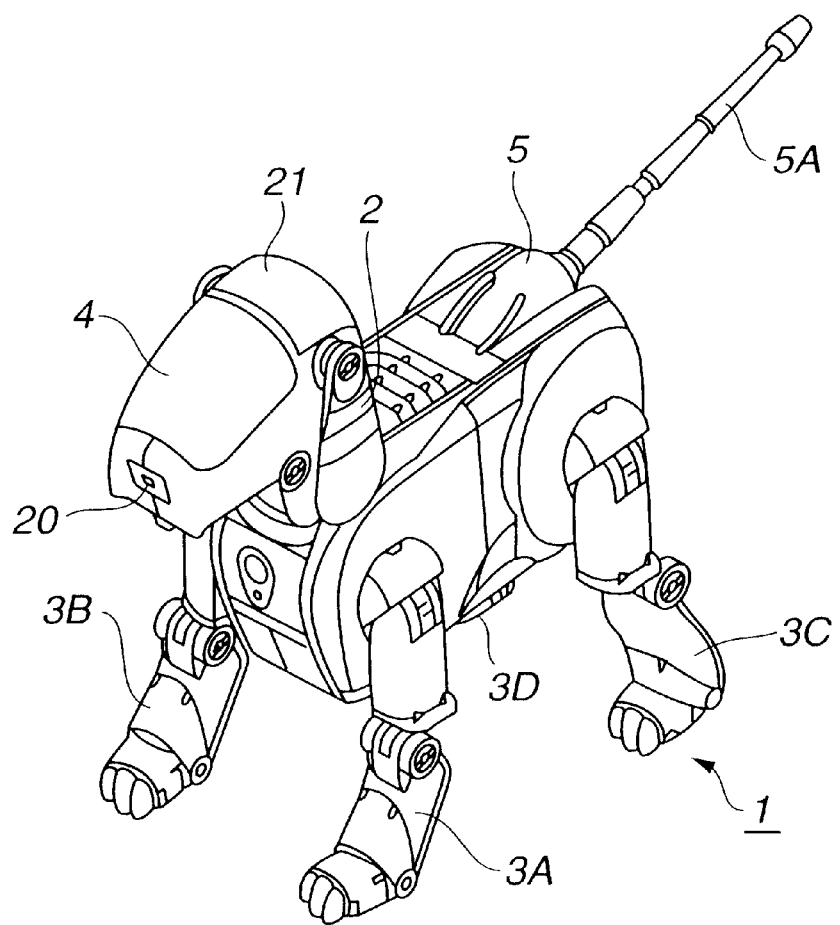
FIG. 1 is a perspective view showing the appearance of an embodiment of the robot apparatus according to the present invention.

FIG. 1 shows an concrete example of the robot apparatus generally indicated with a reference 1. The robot apparatus 1 is shaped like an animal such as "dog", namely, a pet robot. As shown, the robot apparatus 1 is composed of a body block 2, leg blocks 3A, 3B, 3C and 3D joined to the front and rear and right and left portions, respectively, of the body block 2, a head block 4 and tail block 5 joined to the front and rear ends, respectively, of the body block 2. The robot apparatus 1 constructed as above autonomously behaves by actuating the moving parts such as the leg blocks 3A, 3B, 3C, 3D, etc. adaptively to its own (internal) state and surrounding (external) environment or according to an instruction or action made by the user to the robot apparatus 1.

Figure 2:
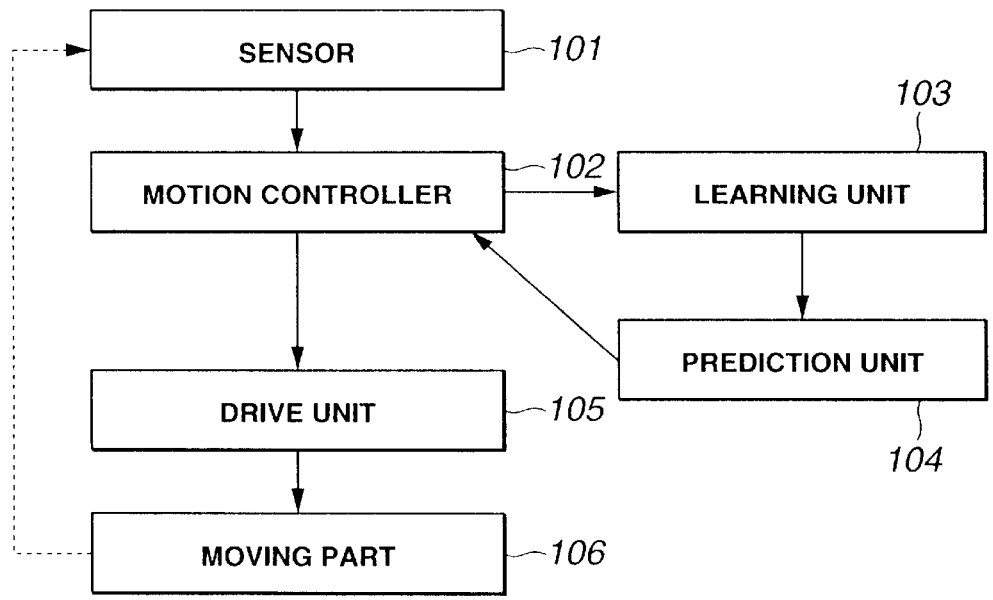
FIG. 2 is a block diagram of essential units included in the robot apparatus according to the present invention to learn an action and do otherwise.

The robot apparatus 1 is designed to learn an action taught by the user. The action learned by the robot apparatus 1 is such that for example, when just pushed at the hip portion, the robot apparatus 1 will make a pre-taught corresponding action (may be referred to as "reaction") as will be described in detail later. FIG. 2 is a block diagram of a learning system provided in the robot apparatus 1 to make such a learning. As shown, the learning system in the robot apparatus 1 includes a sensor 101, motion controller 102, learning unit 103, prediction unit 104 and a drive unit 105.

The robot apparatus 1 has also a moving part 106 which refers herein to any one of the leg blocks 3A to 3D, head block 4, etc. When the moving part 106 is operated or moved, it generates a time-series signal correspondingly to the operation. The learning unit 103 learns the time-series signal. The motion controller 102 and drive unit 105 control together the moving part 106 on the basis of a signal generated at the moving part 106 due to an external force applied to the moving part 106 and the time-series signal having been learned by the learning unit 103. After the learning, the prediction unit 104 predicts an action based on the initial signal generated at the moving part 106 due to the external force applied to the moving part 106.

Each of the components of the learning system in the aforementioned robot apparatus 1 will be described in detail herebelow. The sensor 101 detects a change in position of the moving part 106. The sensor 101 is a potentiometer, encoder or the like, for example. It should be noted that of course, the sensor 101 is not limited to any potentiometer or encoder but it may be a one which can detect a change in position, after driven, of the moving part 106 of the robot apparatus 1. Also, in addition to the above change in position of the moving part 106, caused when the robot apparatus 1 autonomously behaves, the sensor 101 can detect a change in position of the moving part 106 caused to move by an external force applied by the user to the robot apparatus 1.

In case the moving part 106 is any of the above-mentioned leg blocks 3A to 3D, the sensor 101 which is a potentiometer detects a rotation angle of a new position the leg blocks 3A to 3D when moved. A detection signal generated by the sensor 101 having detected the angle of rotation is supplied to the motion controller 102.

The motion controller 102 is to control the moving part 106. More specifically, the motion controller 102 controls the moving part 106 according to various kinds of information such as a detection signal from the sensor 101. The motion controller 102 controls the moving part 106 by means of the drive unit 105. That is, the motion controller 102 supplies the drive unit 105 with control signals corresponding to various kinds of information such as the detection signal, etc. Also, the motion controller 102 supplies the detection signal from the sensor 101 to the learning unit 103 as well. The learning unit 103 will be described in detail later.

The drive unit 105 controls the moving part 106 according to the control signal from the motion controller 102. That is, the drive unit 105 actuates, according to the control signal, the leg blocks 3A, 3B, 3C and 3D, head block 4 or tail block 5, etc. which are generically referred to herein as the moving part 106.

The learning unit 103 is designed to learn a time-series signal (detection signal) generated at the moving part according to a motion made by the moving part 106 having been actuated under the control signal from the motion controller 102. The detection signal learned by the learning unit 103 is a signal generated by the sensor 101 when the moving part 106 has been applied with an external force by the user for the purpose of an action learning by the robot apparatus 1 and thus forced to change in posture, for example.

More specifically, the time series signal from the sensor 101 is a result of the detection, by the sensor 101, of a sequence of changes in position or motions of the moving part 106. It includes an angle of rotation (indirect angle) detected by a potentiometer as a change in position of any of the leg blocks 3A to 3D as above for example.

The prediction unit 104 predicts (or recalls) an action on the basis of the result of the above learning made by the learning unit 103 based on a detection signal from the sensor 101. For example, having associated a behavior or an external force applied to the robot apparatus with a predictable action, the prediction unit 104 provides the motion controller 102 with such a piece of information as defines a corresponding action, when such a behavior or external force is applied to the robot apparatus.

The learning unit 103 and prediction unit 104 work together to allow an action learning as will be described below by way of example. To teach an action to the robot apparatus 1, the user pushes down the robot apparatus 1 at the hip, for example. The user repeats such an action to the robot apparatus 1 a plurality of times, for example. At this time, a rotation angle of any of the leg blocks 3A to 3D of the robot apparatus 1 will be learned by the learning unit 103.

In the robot apparatus 1, the prediction unit 104 predicts an action on the basis of the result of learning from the learning unit 103. More particularly, when the user pushes down the robot apparatus 1 at the hip portion after such a learning, the prediction unit 104 will predict that the user's action made onto the robot apparatus 1 is a one the learning unit 103 has already learned, and supplies corresponding-action defining information to the motion controller 102. That is, the robot apparatus 1 predicts, based on the result of learning having already been acquired, that the momentary downward pressing of the hip portion will lead to an action having already been taught, and expresses the predicted action as an autonomous one.

More specifically, the process made at this time in the robot apparatus 1 is such that a magnitude and direction of a force applied to the robot apparatus 1 are detected based on the learning result from the learning unit 103 and a motion of each joint and necessary torque are computed in the prediction unit 104 on the basis of the detected magnitude and direction of the applied force to provide information for driving a corresponding actuator. In this case, the prediction unit 104 predicts (recalls) an action from the magnitude and direction of the applied force according to the result of learning, and feeds the torque information as control information for causing the moving part 106 to do the predicted action back to the motion controller 102.

Figure 3:
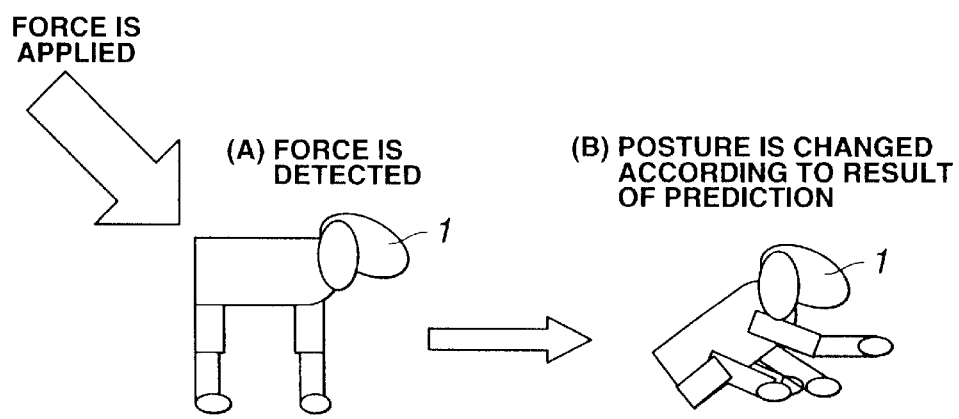
FIG. 3 explains actions of the robot apparatus, effected through the learning.

Thus, after having learned such a behavior, the robot apparatus 1 will autonomously make a behavior corresponding to the learned one just with the hip portion momentarily pushed by the user as shown in FIG. 3. As an application of this learning, just repeated taking of the robot apparatus 1 by the hand will teach the robot apparatus 1 a behavior corresponding to a user's instruction "Give me a hand". After this teaching, the robot apparatus 1 will autonomously make the thus learned hand-giving behavior in response to the same action made by the user onto the robot apparatus 1.

Figure 4:
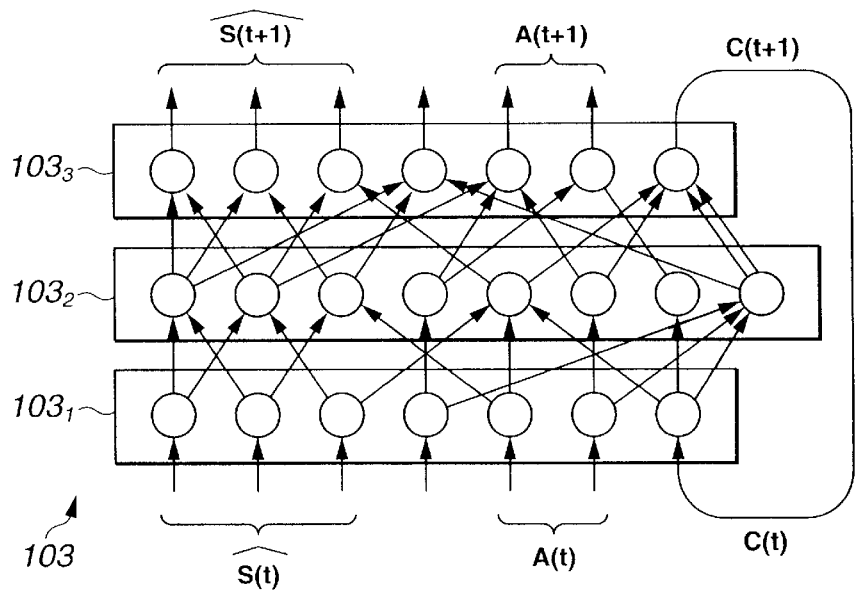
FIG. 4 shows an RNN (recurrent type neural network) forming the learning unit of the robot apparatus shown in FIG. 1.

The learning unit 103 and prediction unit 104 for the above behavior of the robot apparatus 1 will be described in detail below concerning their construction:

The learning unit 103 is formed from a neural network. The neural network as the learning unit 103 has a hierarchy of an input layer $103_1$, hidden layer (or intermediate layer) $103_2$ and an output layer $103_3$, as shown in FIG. 4. More specifically, the neural network is a recurrent type one (will be referred to as "RNN" hereunder) having a loop for a feedback from the output layer $103_3$ toward the input layer $103_1$.

Each of the input layer $103_1$, hidden layer (or intermediate layer) $103_2$ and output layer $103_3$, forming together the RNN, has a predetermined number of neurons connected at random to each other between the layers. A part of the neurons in the output layer $103_3$ is connected to the output layer $103_3$ as context neurons which are feedback neurons. For example, in case the neurons included in the output layer $103_3$ count 14 in number, two of them are connected as context ones to the input layer $103_1$. The connection of the neurons to each other between the layers is conceptualized as a weighting factor. In the RNN, the learning is done as will be described below. It should be noted that the weighting factor, that is, the inter-layer connection of neurons, is tuned and stored.

For learning in the RNN, input information as a subject to be learned is supplied from the input layer $103_1$ toward the output layer $103_3$. For example, the information as a subject to be learned is supplied as a vector value. In each of the layers, the input vector is multiplied by a weighting factor of each neuron, and the data thus provided is supplied to any other neuron in the subsequent layer.

More particularly, the learning in the RNN is effected in the order of a rehearse sequence and actual learning. The rehearse sequence includes mainly two processes, and also the actual learning includes mainly two processes.

Figure 5:
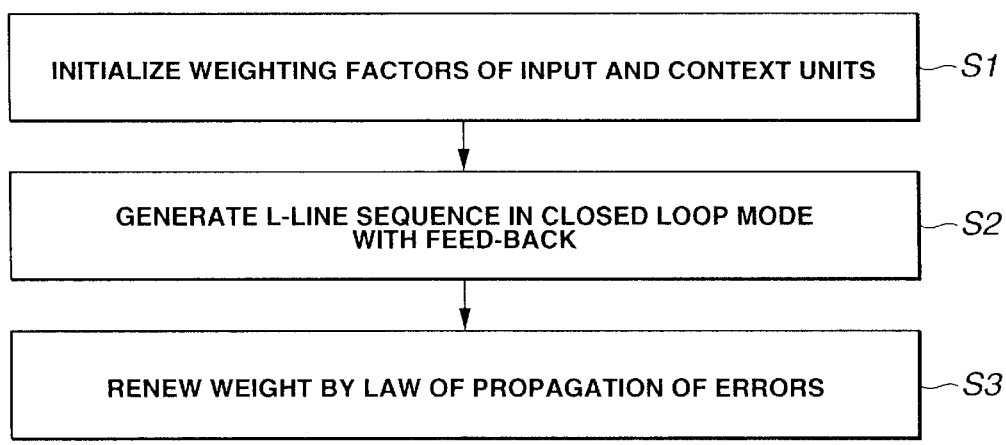
FIG. 5 shows a flow of operations made in learning an action in the robot apparatus.

As shown in FIG. 5, in step S1 in the first process of the rehearse sequence, the weighting factors of an input unit and context unit of the RNN are initialized at random for example.

In step S2 in the second process of the rehearse sequence, there is set a closed loop mode in which an output is fed back to an input, and an N-step sequence is generated from the initialized weighting factors.

Then, the first and second processes are repeated a predetermined number of times (L times for example herein) to provide L rehearse sequences.

With the L lines of rehearse sequences, an actual learning is done. In the first process of the actual learning, the L rehearse sequences obtained as above and a latest experience sequence are added together to provide (L+1) learning sequences.

In step S3 in the second process of the actual learning, the learning sequences obtained in the above first step is done M times under the law of back propagation of errors, namely, the so-called back propagation law, to renew th weighting factors (also called "weighting matrices" for example).

Note that the law of back projection of errors is generally such that an error or difference between an output value from the output layer $103_3$ (predicted value of detection signal from the sensor, for example) and a value actually obtained at a next time (predicted value of detection signal from the sensor, for example) is fed back from the output layer $103_3$ to the input layer $103_1$.

The above learning process provides a weighting factor being the inter-layer connection of neurons. For example, termination of a learning is decided when the error or difference between an output value from he input layer $103_1$ and a required pattern is larger than a predetermined value or by repeating the learning a predetermined number of times.

The learning unit 103 is formed from the above-mentioned RNN. On the other hand, the prediction unit 104 is formed as a function to predict an action based on the result of learning from the learning unit 103, namely, as a function to make a predictive operation by the so-called inverse dynamics. In contrast to the prediction unit 104, the learning unit 103 can be said to be a function to make the so-called forward dynamics.

Figure 6:
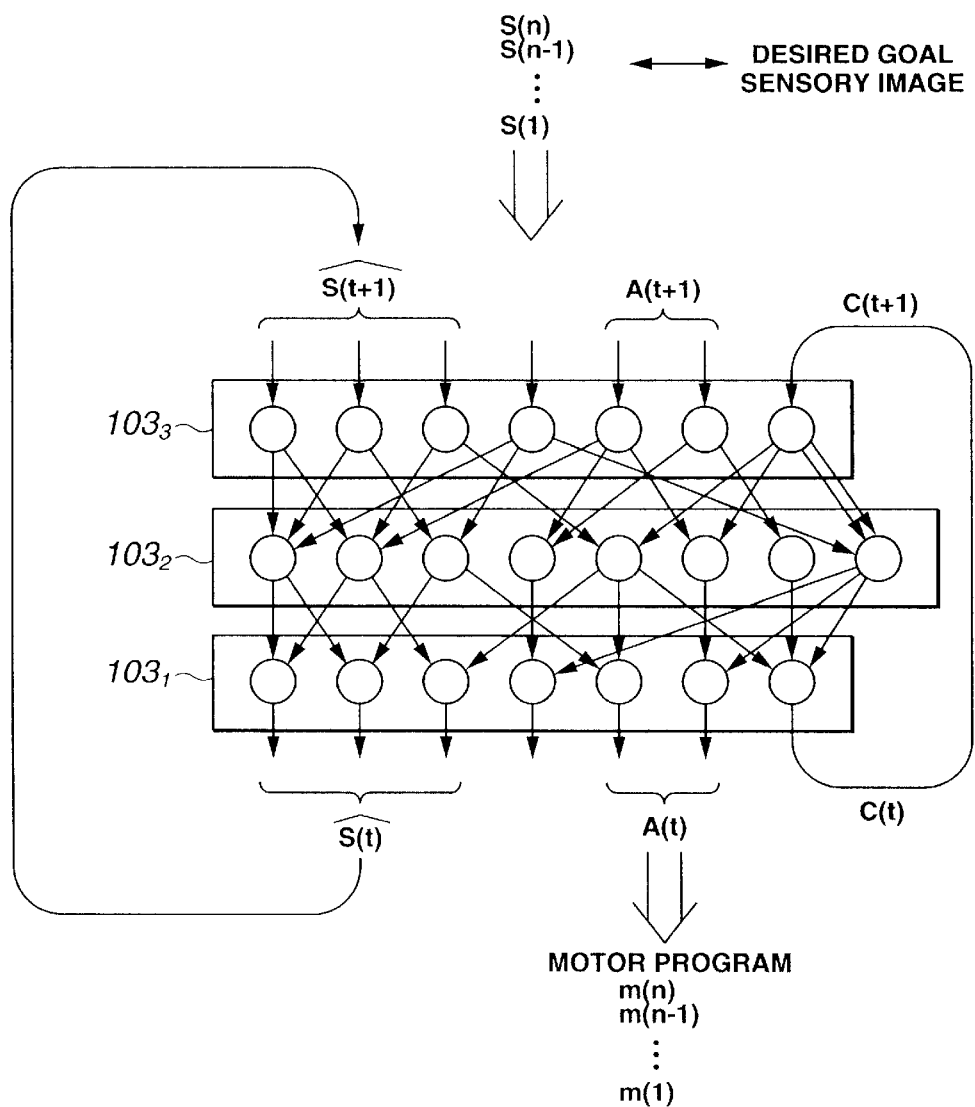
FIG. 6 shows an inverse RNN forming a prediction unit in the robot apparatus shown in FIG. 1.

Based on the so-called inverse RNN (or $RNN^{-1}$) which may be considered to be an inverse transformation of the aforementioned RNN, the prediction unit 104 predicts an action according to the result of learning made in the RNN. The inverse RNN is illustrated in FIG. 6, for example, correspondingly to the RNN in FIG. 4. As shown, the inverse RNN includes an input layer $103_1$, hidden layer $103_2$ and an output layer $103_3$.

The prediction unit 104 is formed from the above inverse RNN. Next, the operations of the aforementioned RNN and inverse RNN will be described concerning concrete examples. In the RNN, an input value will be a sensor output indicative of the state of a sensor and a motor output indicative of the state of a motor, and an output value corresponding to the input value will be a predicted value (will be referred to as "sensor predicted value" hereunder).

As shown in FIG. 4, the RNN is supplied at the input layer $103_1$ thereof with a sensor output $S_t$ and motor output $m_t$ and delivers an output $S_{t+1}$ corresponding to the input and indicating the sensor state and output $m_{t+1}$ also corresponding to the input and indicating the motor state at the output layer $103_3$ thereof. In the RNN, a part of the outputs is fed as a content $C_t$ back to the input layer $103_1$. Note that in the RNN, the feedback is effected by the back propagation law on the basis of an error between an output sensor predicted value $S_{t+1}$ and a sensor value $S_{t+1}$ actually measured at a next time.

In the RNN, a weighting factor of each layer is decided as a result of learning based on input information to the input layer $103_1$. That is, using this RNN, the robot apparatus 1 decides the weighting factor as a result of learning on the basis of the sensor output $S_t$ taken as a value detected by the potentiometer in each of the leg blocks 3A to 3D when the hip portion is pushed down, for example.

On the other hand, the inverse RNN can provide a predicted value as an inverse transformation of the aforementioned RNN on the basis of a result of learning. More specifically, the inverse RNN is supplied with a sensor predicted value $S_n$ and context $C_n$ at a time $\underline{n}$ as shown in FIG. 6. Thus the inverse RNN will provide a sensor input, motor-state input and content $C_{n-1}$ at a time n-1. Then, similarly to the RNN, the inverse RNN uses the back propagation law to operate with an error between an input to a forward dynamics and an output result.

By sequentially feeding back the sensor input and context as the result of operation, the inverse RNN outputs the time-retraced sequence of the motor states as a predicted value. Finally, the inverse RNN can provide time series $A_1$, $A_2, \ldots, A_{n-1}$ of an action for the sensor output $S_n$ at the time $\underline{n}$ or time series $m_1, m_2, \ldots, m_{n-1}$ of the motor. The prediction unit 104 formed from the inverse RNN outputs the time series $m_1, m_2, \ldots, m_{n-1}$ of the motor to the motion controller 102 which will acquire time-series torque information from the time series of the motor and outputs it to the drive unit 105. The drive unit 105 controls the moving part 106 on the basis of the time-series torque information.

Using the above inverse RNN, the robot apparatus 1 predicts, from the pre-acquired result of learning again after the learning, that a momentary down-pushing of the hip portion will lead to a pre-taught action, and makes the action as an autonomous operation.

As above, the learning unit 103 is formed from the aforementioned RNN and the prediction unit 104 is formed from the above inverse RNN. Using the learning unit 103 formed from such an RNN and prediction unit 104 formed from such an inverse RNN, the robot apparatus 1 can learn a taught action from sensor information, and predict, from the input sensor information after the learning, a torque to be outputted at the next time, and thus shift to a desired posture (recalled one).

(1) Construction of the Robot Apparatus According to the Embodiment

In the foregoing, the embodiment of the present invention has been described concerning the application thereof to the robot apparatus 1. The construction of the robot apparatus 1 will be described in further detail.

As already illustrated in FIG. 1, the robot apparatus 1 is shaped like an animal such as "dog", namely, a pet robot. As shown, the robot apparatus 1 is composed of a body block 2, leg blocks 3A, 3B, 3C and 3D joined to the front and rear and right and left portions, respectively, of the body block 2, a head block 4 and tail block 5 joined to the front and rear ends, respectively, of the body block 2.

Figure 7:
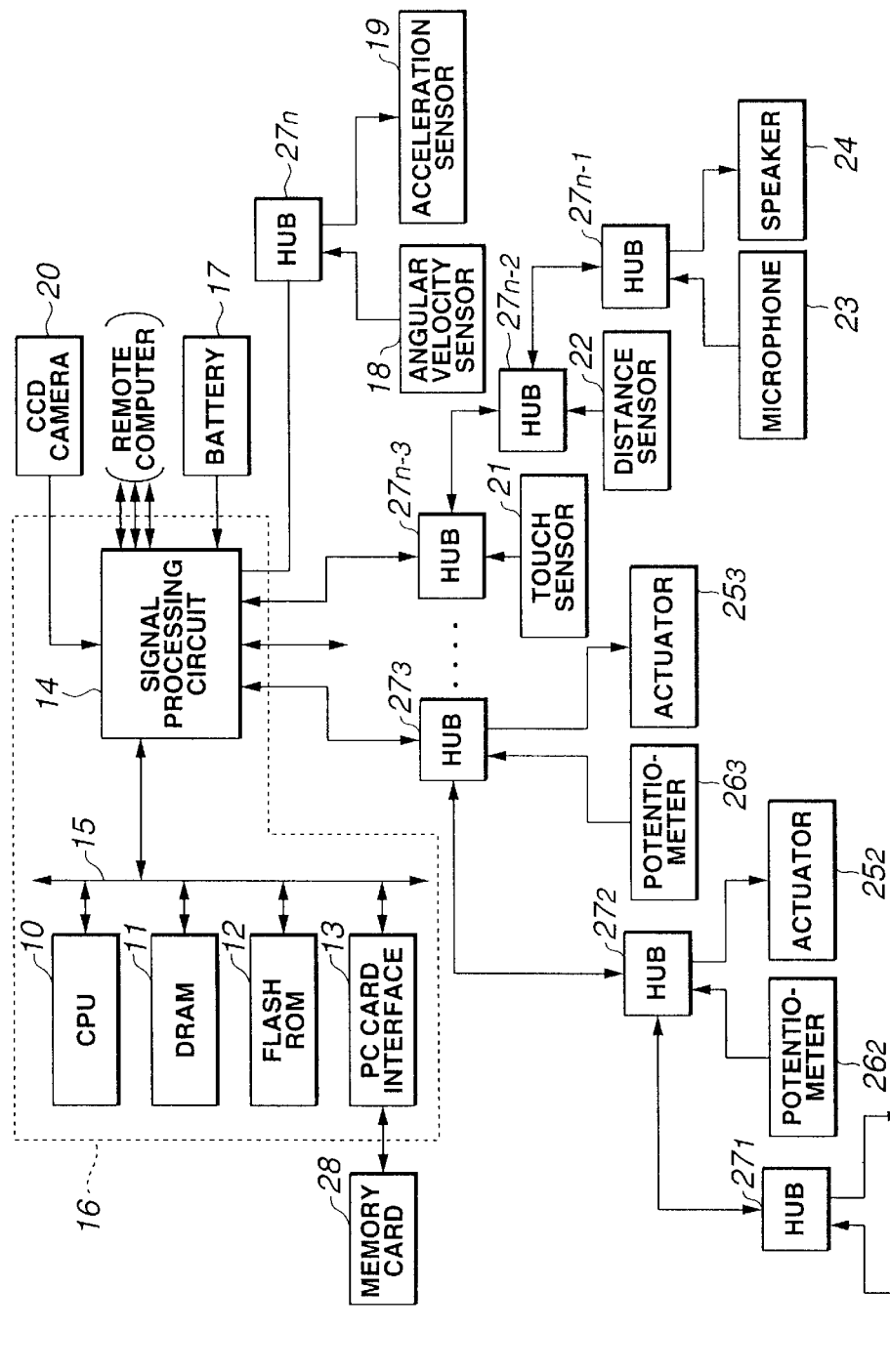
FIG. 7 is a block diagram of the circuit construction of the robot apparatus.

As shown in FIG. 7, the body block 2 houses a control unit 16 formed by connecting a CPU (central processing unit) 10, DRAM (dynamic random-access memory) 11, flash Rom (read-only memory) 12, PC (personal computer) card interface circuit 13 and a signal processing circuit 14 to each other via an internal bus 15, and a battery 17 as a power source for the robot apparatus 1. The body block 2 houses also an angular velocity sensor 18, acceleration sensor 19, etc. which detect the direction and acceleration of motion of the robot apparatus 1.

The head block 4 has disposed in place therein a CCD (charge-coupled device) camera 20 to capture the outside circumference, a touch sensor 21 to detect a pressure applied to the robot apparatus 1 when the user makes a physical action to the robot apparatus 1 such as "patting" or "hitting", a distance sensor 22 to measure the distance from the robot apparatus 1 to an object existing before it, a microphone 23 to pick up an external sound, a speaker 24 to output a sound such as yelping, LEDs (light-emitting diode) (not shown) equivalent to the "eyes" of the robot apparatus 1.

Further, the joints of the leg blocks 3A to 3D, couplings between the leg blocks 3A to 3D and body block 2, coupling between the head block 4 and body block 2, coupling between a tail 5A and tail block 5, etc. have disposed therein actuators $25_1$ to $25_n$ and potentiometers $26_1$ to $26_n$ for there respective numbers of degrees of freedom. For example, each of the actuators $25_1$ to $25_n$ is a servo motor. The leg blocks 3A to 3D are controlled by their respective servo motors to make a goal posture or motion. The potentiometers $26_1$ to $26_n$ form together the sensor 101 having previously been described with reference to FIG. 2.

The sensors including the angular velocity sensor 18, acceleration sensor 19, touch sensor 21, distance sensor 22, microphone 23, speaker 24 and potentiometers $26_1$ to $26_n$, and the LEDs and actuators $25_1$ to $25_n$ are connected to the signal processing circuit 14 in the control unit 16 via hubs $27_1$ to $27_n$, respectively. The CCD camera 20 and battery 17 are connected directly to the signal processing circuit 14.

The signal processing circuit 14 sequentially acquires sensor data, image data and sound data from the sensors and sequentially stores the data in place in the DRAM 11 via the internal bus 15. Also, the signal processing circuit 14 acquires battery residual-potential data from the battery 17, and stores the data in place in the DRAM 11.

The sensor data, image data, sound data and battery residual-potential data stored in the DRAM 11 are subsequently used by the CPU 10 for controlling the operation of the robot apparatus 1.

Actually in the initial operation just after the robot apparatus 1 is turned on, the CPU 10 reads a control program from a memory card 28 set in a PC card slot (not shown) in the body block 2 or the flash ROM 12 via the PC card interface circuit 13 or directly, and stores the program into the DRAM 11. It should be noted that the CPU 10 functions as the motion controller 10 having previously been described with reference to FIG. 2.

Thereafter, based on the sensor data, image data, sound data and battery residual-potential data sequentially stored into the DRAM 11 from the signal processing circuit 14 as above, the CPU 10 determines the internal status and surrounding environment of the robot apparatus 1, and whether or not an instruction and action have been made from the user.

The CPU 10 decides the next behavior on the basis of the result of determination and the control program stored in the DRAM 11, and drives corresponding ones of the actuators $25_1$ to $25_n$ on the basis of the determination to turn the head block 4 vertically or horizontally, move the tail 5A of the tail block 5, and actuate the leg blocks 3A to 3D for walking, for example.

Also, the CPU 10 generates sound data when necessary and supplies it as a sound signal to the speaker 24 via the signal processing circuit 14 to output a sound based on the sound signal, or turns on and off or flicker the LEDs.

As above, the robot apparatus 1 can autonomously behave adaptively to its own status and surrounding environment and in response to an instruction and action from the user.

(2) Software Configuration of the Control Program

Figure 8:
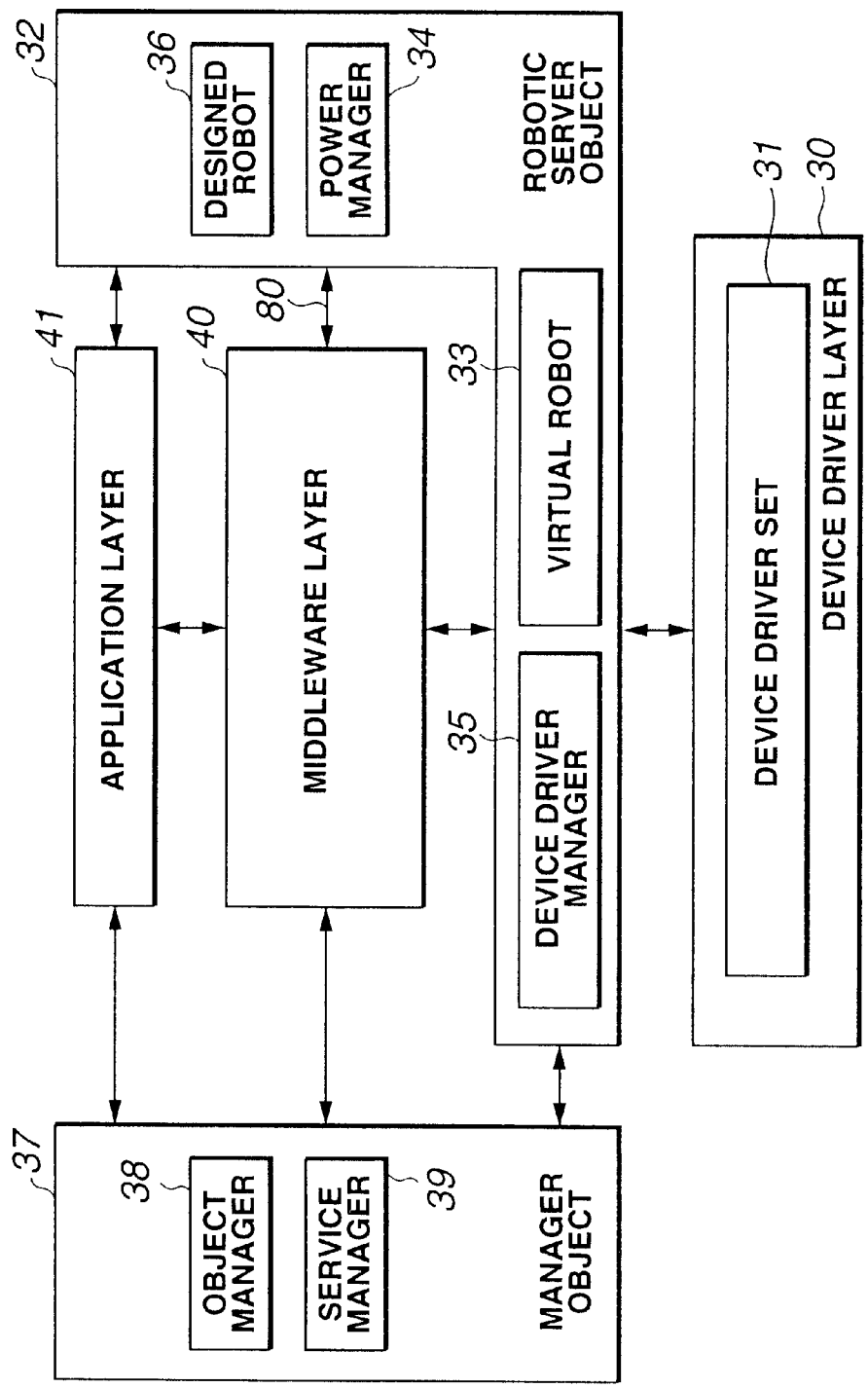
FIG. 8 is a block diagram showing the software configuration in the robot apparatus shown in FIG. 1.

FIG. 8 shows the software configuration of the above-mentioned control program used in the robot apparatus 1. As shown, the control program includes a device driver layer 30 laid in the bottom layer thereof and composed of a set of device drivers 31. In this program, each of the device drivers 31 is an object allowed to access directly the CCD camera 20 (in FIG. 7) and ordinary computer hardware such as a timer and works upon interruption from a corresponding hardware.

The control program includes also a robotic server object 32 laid above the device driver layer 30. The robotic server object 32 is composed of a virtual robot 33 formed from a software group which provides an interface for access to the hardware such as the aforementioned sensors and actuators 25 ($25_1$ to $25_n$), a power manager 34 formed from a software group which manages switching between the batteries, a device driver manager 35 formed from a software group which manages the other various device drivers, and a designed robot 36 formed from a software group which manages the mechanism of the robot apparatus 1.

The control program includes also a manager object 37 composed of an object manager 38 and service manager 39. In this control program, the object manager 38 is a software group which manages start and end of each of software groups included in the robotic server object 32, middleware layer 40 and application layer 41. The service manager 39 is a software group which manages connection between objects on the basis of information about the inter-object connection, described in a connection file stored in the memory card 28 (in FIG. 7).

The middleware layer 40 is formed from a software group laid above the robotic server object 32 to provide basic functions of the robot apparatus 1 such as image processing and sound processing. The application layer 41 is formed from a software group laid above the middleware layer 40 to decide a behavior of the robot apparatus 1 on the basis of the result of processing by each software group included in the middleware layer 40.

Figure 9:
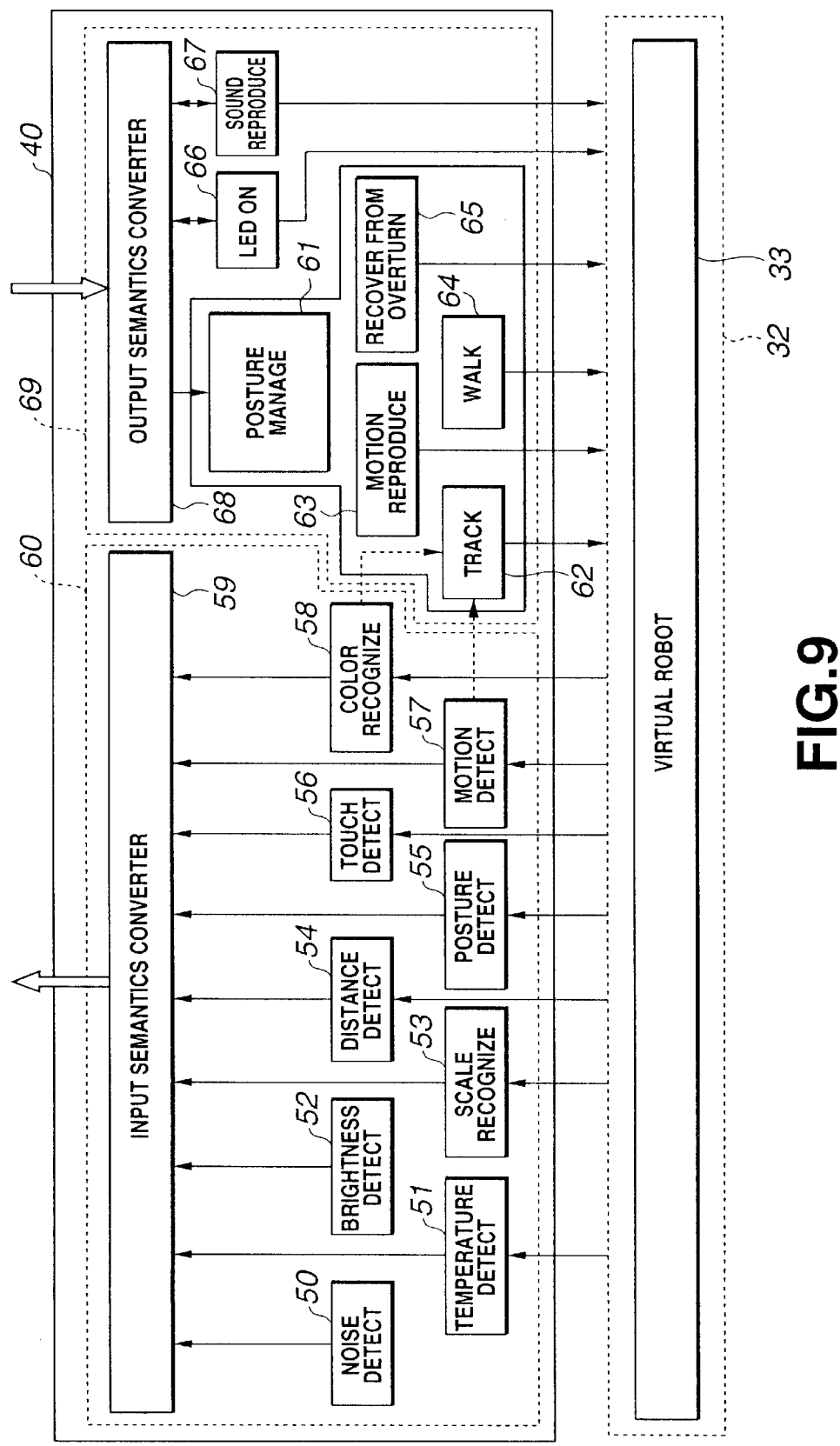
FIG. 9 is a block diagram showing the configuration of the middleware layer in the robot apparatus in FIG. 8.

The software configurations of the middleware layer 40 and application layer 41 are illustrated in detail in FIG. 9.

As seen from FIG. 9, the middleware layer 40 is composed of a recognition system 60 including signal processing modules 50 to 58 for detection of noise, temperature, brightness, scale, distance, posture, touch, motion and color, respectively, input semantics converter module 59, etc., and an output system 69 including an output semantics converter module 68 and signal processing modules 61 to 67 for posture management, tracking, motion reproduction, walking, recovery from overturn, LED turn-on and sound reproduction, respectively.

In this embodiment, the signal processing modules 50 to 58 included in the recognition system 60 acquire corresponding ones of the sensor data, image data and sound data read by the virtual robot 33 in the robotic server object 32 from the DRAM 11 (in FIG. 7), make predetermined processing on the basis of the data, and supply the result of processing to the input semantics converter module 59. For example, th virtual robot 33 is designed for signal transfer or conversion under a predetermined communications code.

The input semantics converter module 59 recognizes, on the basis of the result of processing supplied from the signal processing modules 50 to 58, the internal status and surrounding environment of the robot apparatus 1 and an instruction and action from the user, such as "noisy", "hot", "bright", "the robot apparatus detected a ball", "the robot apparatus detected itself tumbled", "the robot apparatus was patted", "the robot apparatus was hit", "the robot apparatus heard scales "do", "mi" and "so", "the robot apparatus detected a moving object" or "the robot apparatus detected an obstacle", and outputs the results of recognition to the application layer 41 (in FIG. 7).

Figure 10:
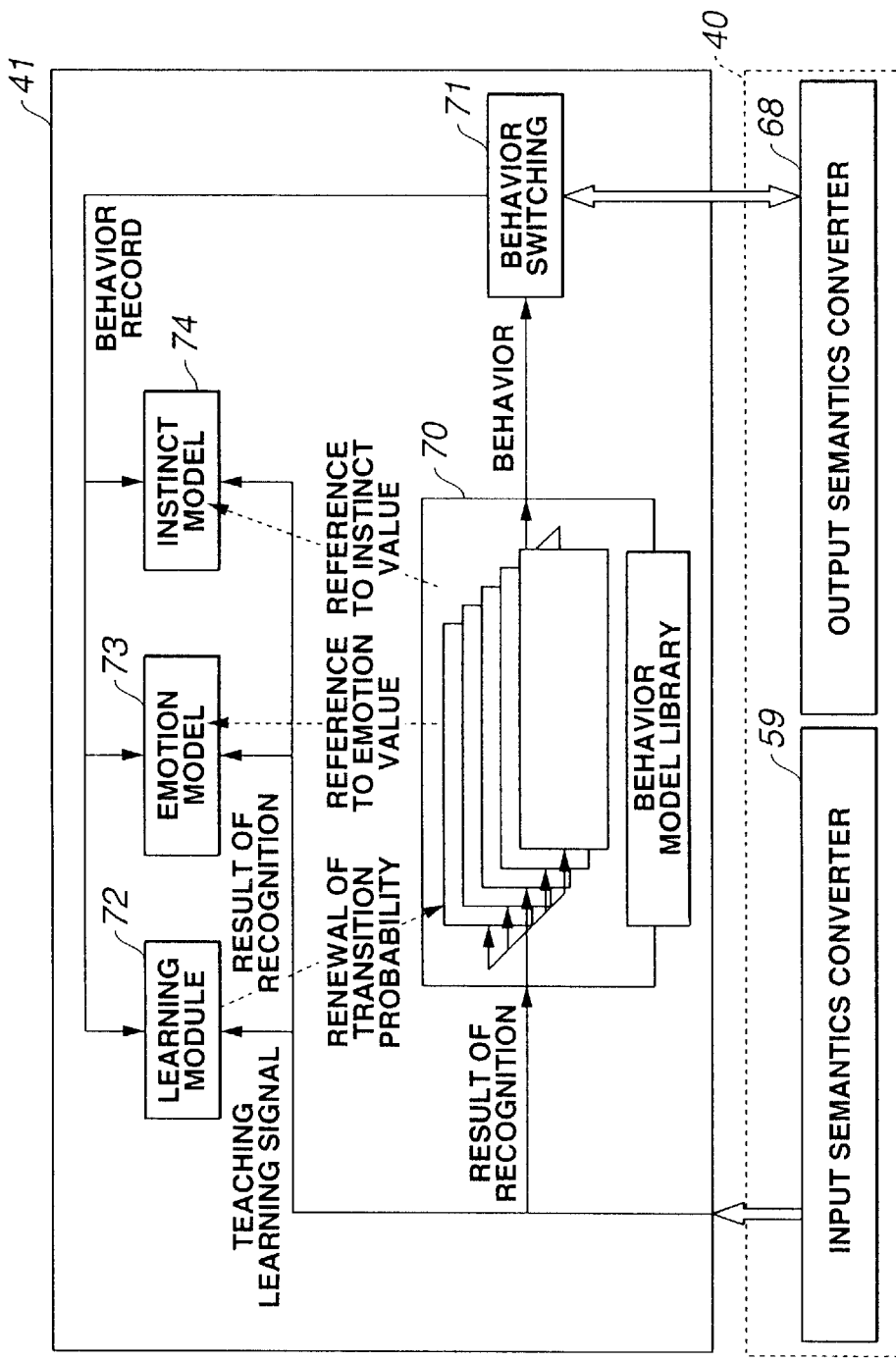
FIG. 10 is a block diagram showing the configuration of the application layer in the software configuration of the robot apparatus shown in FIG. 1.

As shown in FIG. 10, the application layer 41 is composed o five modules including a behavior model library 70, behavior switching module 71, learning module 72, emotion model 73 and an instinct model 74.

Figure 11:
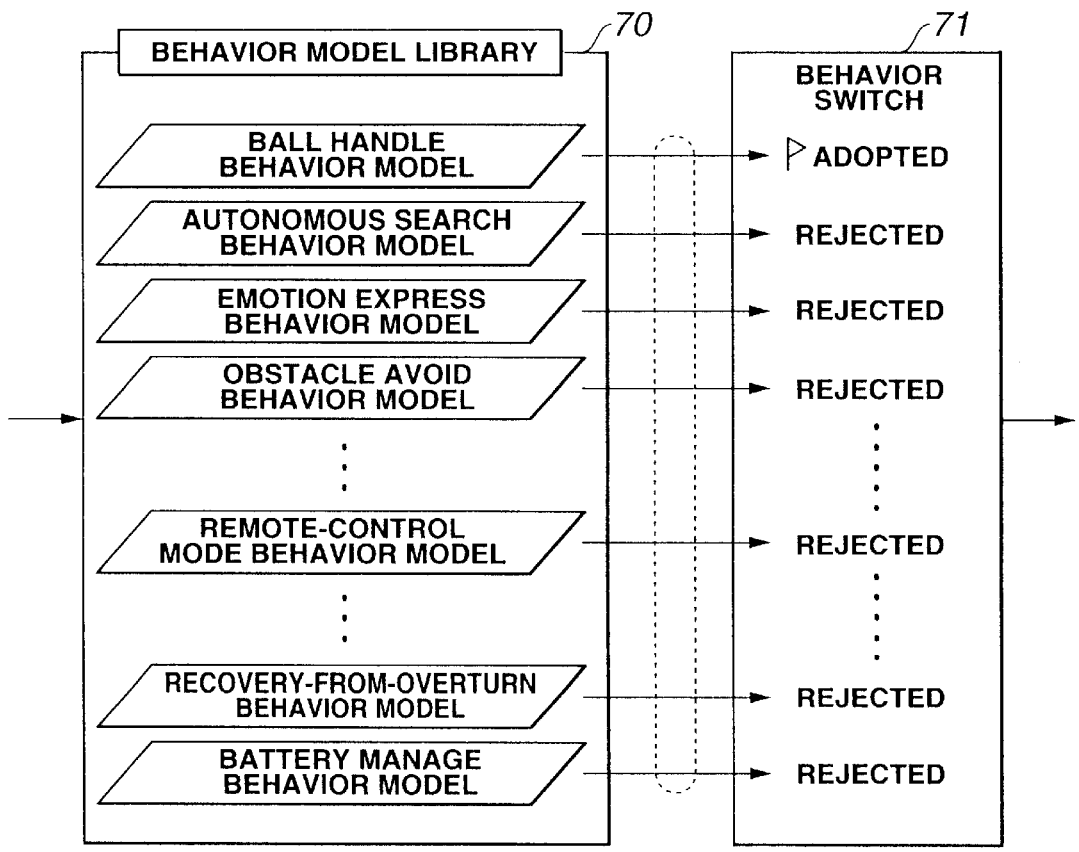
FIG. 11 is a block diagram showing the configuration of the behavior model library in the application layer shown in FIG. 10.

In this embodiment, the behavior model library 70 includes independent behavior models $70_1$ to $70_n$ corresponding to some pre-selected conditional items such as "the battery residual-potential has become low", "the robot apparatus recovers from overturn", "the robot apparatus walks avoiding an obstacle", "the robot apparatus expresses an emotion", "the robot apparatus has detected a ball", etc. as shown in FIG. 11.

When supplied with the results of recognition from the input semantics converter module 59 or upon elapse of a predetermined time after the last result of recognition is supplied, the behavior models $70_1$ to $70_n$ decide the next behavior and supply the result of decision to the behavior switching module 71 while referring to a corresponding emotion parametric value held in the emotion model 73 and a corresponding desire piece parametric value held in the instinct model 74 as necessary as will be described later.

Figure 12:
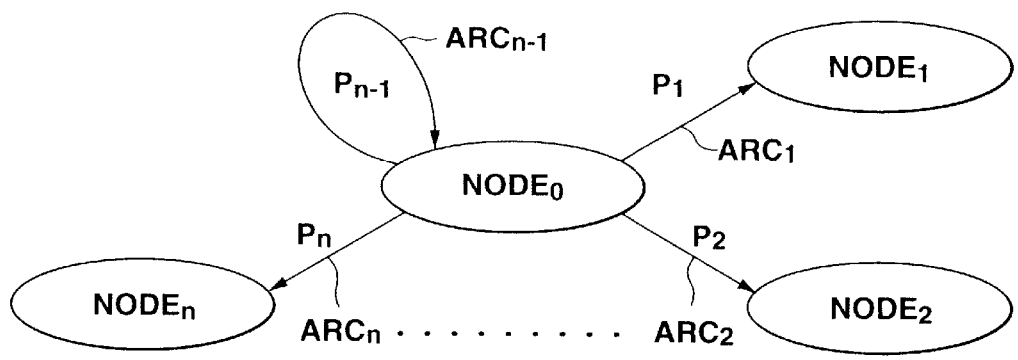
FIG. 12 explains a finite probability automaton as information for deciding a behavior of the robot apparatus.

Note that in this embodiment, each of the behavior models $70_1$ to $70_n$ uses an algorithm called "probability automaton" as a means of deciding the next behavior in order to stochastically decide which one of nodes $NODE_0$ to $NODE_n$ (as shown in FIG. 12) is a transition source and which other one of the nodes $NODE_0$ to $NODE_n$ is a transition destination, on the basis of transition probabilities $P_1$ to $P_n$ set for arcs $ARC_1$ to $ARC_{n-1}$ connecting the nodes $NODE_0$ to $NODE_n$ to each other.

More specifically, each of the behavior models $70_1$ to $70_n$ has a state transition table 80, as shown in FIG. 13, for each of the nodes $NODE_0$ to $NODE_n$ forming the behavior models $70_1$ to $70_n$.

The state transition table 80 has events (results of recognition) being conditions for transition from one to another of the nodes $NODE_0$ to $NODE_n$ listed in lines thereof corresponding to a column "Input event name" thereof in the order of priority input, and further such transition conditions listed in lines corresponding to columns "Data name" and "Data range".

Therefore, according to the state transition table 80 in FIG. 13, the robot apparatus 1 can transit in state from the $NODE_{100}$ to any other node only when the size of the ball (SIZE), given together with the result of recognition, is within a range "0 to 1000" in case the result of recognition is "the robot apparatus detected a ball (BALL)", or only when the distance from the robot apparatus 1 to the obstacle, (DISTANCE), given together with the result of recognition, is within a range of "0 to 100" in case the result of recognition is "the robot apparatus detected an obstacle (OBSTACLE)".

Also, according to the state transition table 80, the robot apparatus 1 can transit in state from the $NODE_{100}$ to any other node when any one of "JOY", "SURPRISE" and "SADNESS", held in the emotion model 73, among parametric values of emotions and desire pieces held in the emotion model 73 and instinct model 74 to which the behavior model $70_1$ to $70_n$ cyclically refer, has a value within a range of "50 to 100" even if no result of recognition is supplied.

Also in the state transition table 80, there is written in a line "Transition destination node" corresponding to a column "Probability of transition to other node" the names of nodes to which the robot apparatus 1 can transit in state from any one of the nodes $NODE_0$ to $NODE_n$, there is written in a line corresponding to the column "Probability of transition to other node" a probability of transition with which the robot apparatus 1 can transit in state to other one of the nodes $NODE_0$ to $NODE_n$ when all the conditions written in lines "Input event name", "Data value" and "Data range" are met, and there is written in a line "Output behavior" corresponding to the "Probability of transition to other node" a behavior to be made by the robot apparatus 1 when it transits in state to the above node among the nodes $NODE_0$ to $NODE_n$. It should be noted that the sum of probabilities in the lines corresponding to the column "Probability of transition to other node" is 100[%].

Therefore, according to the state transition table 80 in FIG. 13, the robot apparatus 1 can transit in state from the $NODE_{100}$ to the node "node 120" with a probability of [30%] when the results of recognition "the robot apparatus detected a ball (BALL)" and "the size of the ball (SIZE)" is within a range of "0 to 1000", and the output behavior will be "ACTION1".

Each of the behavior models $70_1$ to $70_n$ is composed of a plurality of the nodes $NODE_0$ to $NODE_n$ to be connected to each other as written in the above state transition table 80. When a result of recognition is supplied from the input semantics converter module 59, the behavior model stochastically decides the next behavior by the use of the state transition table 80 of a corresponding one of the nodes $NODE_0$ to $NODE_n$, and supplies the result of decision to the behavior switching module 71.

The behavior switching module 71 shown in FIG. 10 selects, from behaviors outputted from the behavior models $70_1$ to $70_n$, respectively, of the behavior model library 70, ones outputted from the behavior models $70_1$ to $70_n$, having higher predetermined priority, and sends a command for execution of the behaviors (will be referred to as "behavior command" hereunder) to the output semantics converter 68 in the middleware layer 40. It should be noted that in this embodiment, the lowest one of the behavior models $70_1$ to $70_n$ (in FIG. 11) is set to have the highest priority and the highest one is set to have the lowest priority.

Also, the behavior switching module 71 informs the learning module 72, emotion model 73 and instinct model 74 of the completion of the behavior on the basis of behavior completion information supplied from the output semantics converter module 68 after completion of the behavior.

On the other hand, the learning module 72 is supplied with a result of recognition of a teaching given as an action from the user, such as "hit" or "patted", among the results of recognition supplied from the input semantics converter module 59.

Then the learning module 72 will change the probability of transition of a corresponding one of the behavior models $70_1$ to $70_n$ in the behavior model library 70 on the basis of the result of recognition and information from the behavior switching module 71 to lower the probability of execution of the behavior when the robot apparatus 1 has been "hit (scolded)", while raising the behavior execution probability when the robot apparatus 1 has been "patted (praised)".

On the other hand, the emotion model 73 holds a parametric value indicative of the strength of each of six emotions including "joy", "sadness", "anger", "surprise", "disgust" and "fear". The emotion model 73 cyclically renews the parametric values of these emotions according to special results of recognition such as "hit", "patted" and the like supplied from the input semantics converter module 59, elapsed time and information from the behavior switching module 71.

More particularly, the emotion model 73 uses a predetermined algorithm to compute a variation of the emotion at a time from a recognition result supplied from the input semantics converter module 59, behavior of the robot apparatus 1 at that time and elapsed time from the last renewal. Then, taking the emotion variation as $\Delta E[t]$, current parametric value of the emotion as $E[t]$ and coefficient indicating the sensitivity to the emotion as $k_e$, the emotion model 73 determines a parametric value $E[t+1]$ of the emotion in the next cycle by calculating an equation (1), and replaces the previous parametric value $E[t+1]$ with the current parametric value $E[t]$ of the emotion, to thereby renew the parametric value of the emotion. The emotion model 73 similarly calculates the equation (1) to renew the parametric values of all the remaining emotions.

$$E[t+1]=E[t]+k_e \times \Delta E[t] \qquad (1)$$

Note that it is predetermined how much each of the recognition result and information from the output semantics converter module 68 influences the variation $\Delta E[t]$ of the parametric value of each emotion. The predetermination is such that for example, the result of recognition of "hit" will have an greater influence on the variation $\Delta E[t]$ of the parametric value of the "anger" emotion, while the result of recognition of "patted" will have a greater influence on the variation $\Delta E[t]$ of the parametric value of the "joy" emotion.

The information from the output semantics converter module 68 is feed-back information on behavior (behavior-completion information). Namely, it is information on the result of behavior execution. The emotion model 73 will change the emotion with such information. For example, "whining" behavior will lower the level of "anger" emotion. It should be noted that the information from the output semantics converter module 68 is also supplied to the aforementioned learning module 72 which will change, based on the information, the probabilities of transition corresponding to the behavior models $70_1$ to $70_n$.

Note that the result of behavior may be fed back by an output (behavior having a feeling added thereto) of the behavior switching module 71.

On the other hand, the instinct model 74 holds a parametric value indicative of the intensity of each of four desire (instinct) pieces including "exercise", "affection", "appetite" and "curiosity". The instinct model 74 cyclically renews the parametric values of these desire pieces according to results of recognition supplied from the input semantics converter module 59, elapsed time, information from the behavior switching module 71, etc.

More particularly, the instinct model 74 uses a predetermined algorithm to compute a variation of each of instinct (desire) pieces including "exercise", "affection", "appetite", and "curiosity" at a time from a recognition result, elapsed time and information from the output semantics converter module 68. Then, taking the desire piece variation as $\Delta I[k]$, current parametric value of the desire piece as I[k] and coefficient indicating the sensitivity to the desire piece as $k_i$, the instinct model 74 determines a parametric value I[k+1] of the desire piece in the next cycle by calculating an equation (2) in a given cycle, and replaces the value I[k+1] with the current parametric value I[k] of the desire piece, to thereby replace the previous parametric value of the desire piece. The instinct model 74 also calculates the equation (2) to renew the parametric values of all the remaining pieces of instinct (desire) except for the "appetite".

$$I[k+1]=I[k]+k_i \times \Delta I[k] \quad (2)$$

Note that it is predetermined how much each of the recognition result and information from the output semantics converter module 68 influences the variation ΔI[k] of the parametric value of each desire piece. The predetermination is such that for example, information from the output semantics converter module 68 will have a great influence on the variation ΔI[k] of the parametric value of "fatigue" state.

Note that in this embodiment, the parametric values of each the emotions and desire (instinct) pieces are defined to vary within a range of 0 to 100, and the coefficients $k_e$ and $k_i$ are also set for each of the emotions and desire pieces.

On the other hand, the output semantics converter module 68 of the middleware layer 40 supplies, as shown in FIG. 9, a corresponding one of the signal processing modules 61 to 67 of the output system 69 with an abstract behavior command such as "go ahead", "joy", "whine" or "track (a ball)" having been supplied from the behavior switching module 71 of the application layer 41 as above.

When supplied with the above behavior command, the signal processing modules 61 to 67 generate, on the basis of the behavior command, a servo command for supply to a corresponding one of the actuators $25_1$ to $25_n$ (in FIG. 7), sound data from the speaker 24 (in FIG. 7) and/or drive data for supply to the "eyes" LEDs, and sequentially sends these data to the corresponding one of the actuators $25_1$ to $25_n$, speaker 24 or LEDs via the virtual robot 33 of the robotic server object 32 and signal processing circuit 14 (in FIG. 7) in this order.

As above, the robot apparatus 1 can make, under the control program, an autonomous behavior adaptively to its internal state and surrounding environment, instruction and action from the user.

(3) Application of the Present Invention to the Robot Apparatus

The construction of the robot apparatus has been described in the foregoing. Next, the learning by the robot apparatus 1 whose construction has been described in detail above will be described in detail herebelow.

Figure 14:
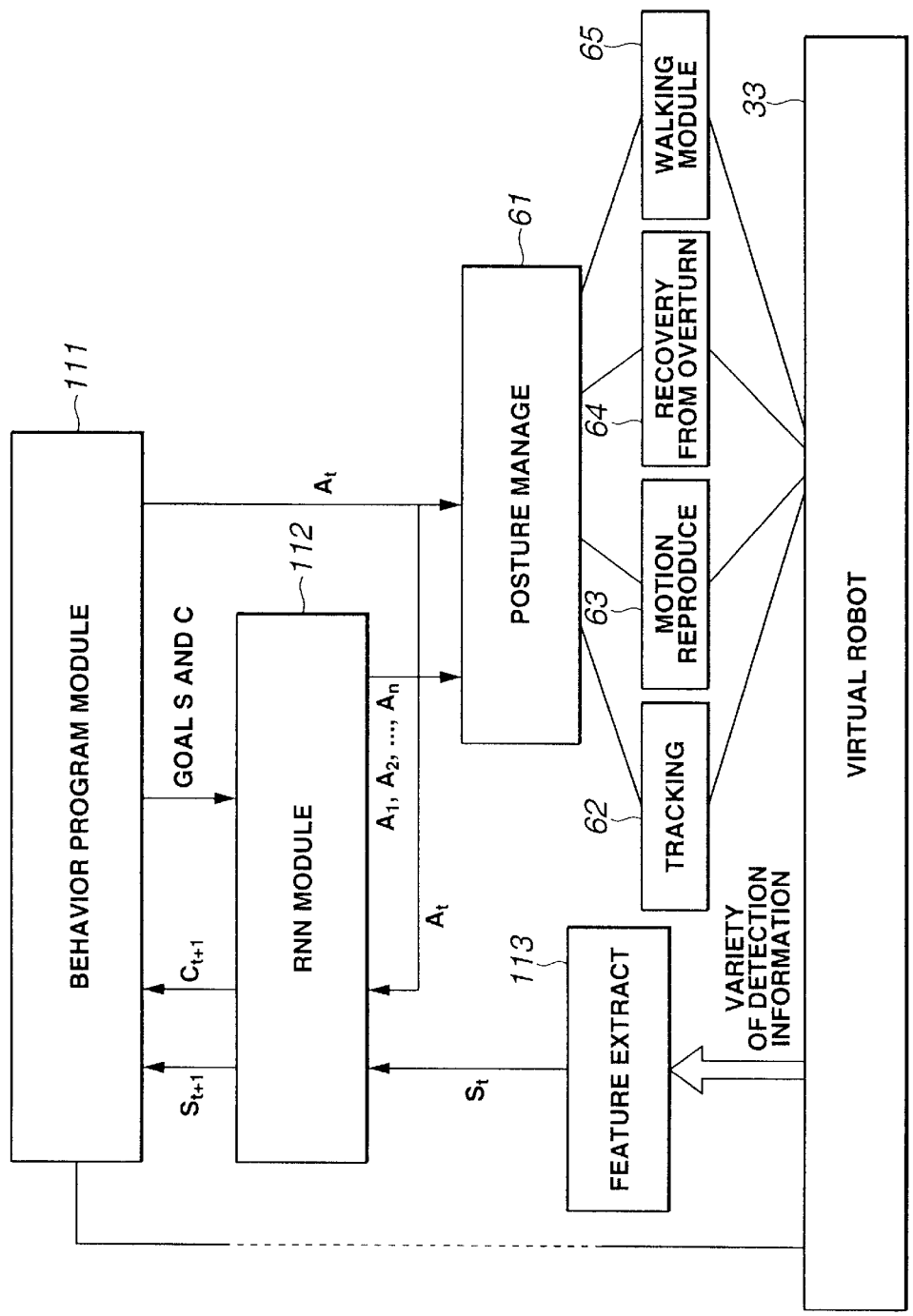
FIG. 14 is a block diagram showing in further detail the configuration of the learning unit etc. in the robot apparatus shown in FIG. 1.

As shown in FIG. 14, the robot apparatus 1 includes, in addition to the aforementioned virtual robot 33 and signal processing modules 61 to 64 for posture controlling tracking, motion reproduction, recovery from overturn and walking, a behavior program module 111, RNN module 112 and a feature extraction module 113. For example, each of these components is a control program. More specifically, they form together the middleware layer 40 having previously been described with reference to FIG. 8. The signal processing modules 61 to 64 for posture controlling tracking, motion reproduction, recovery from overturn and walking are included in the output system 69, and the feature extraction module 113 is included in the recognition system 60.

Figure 15:
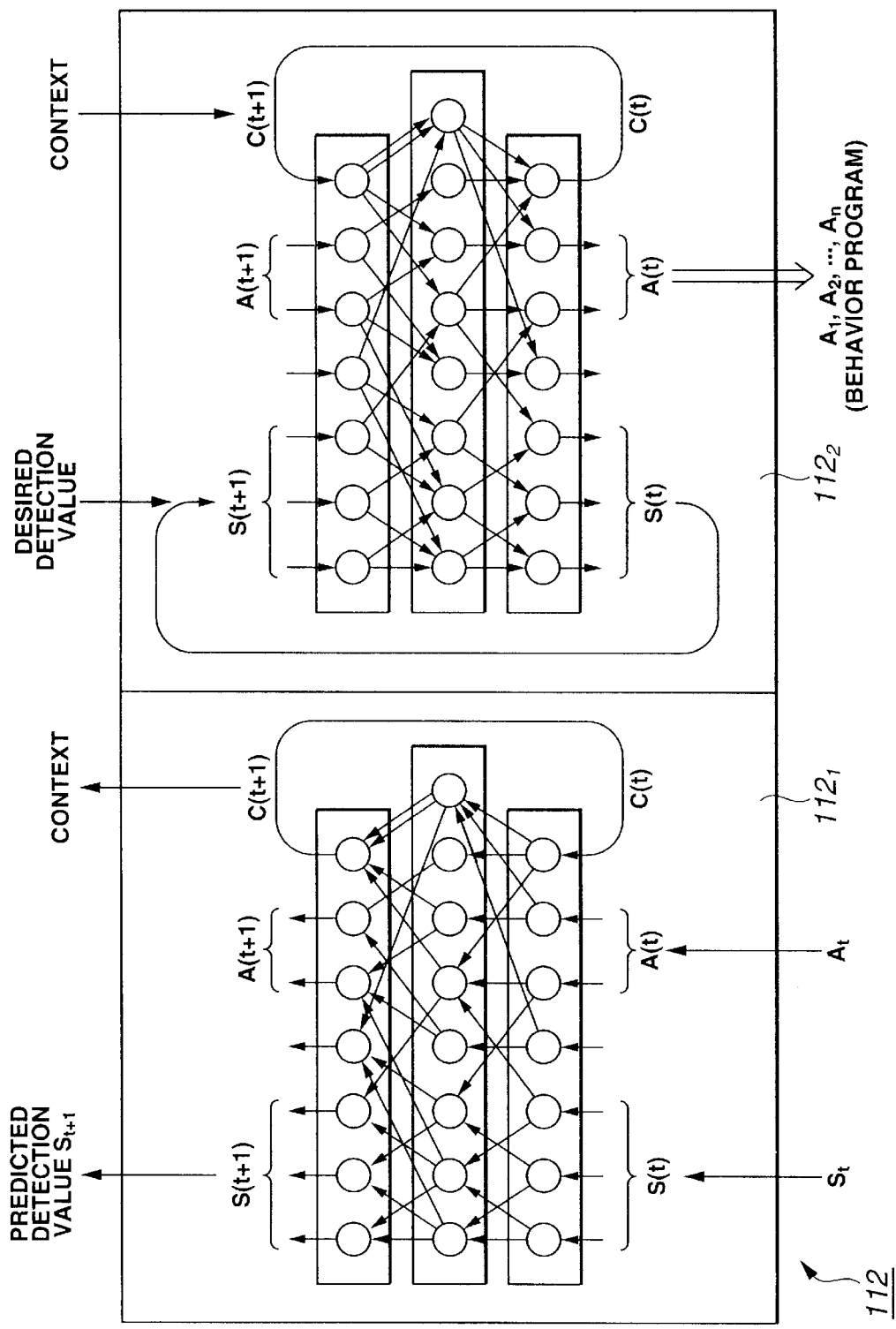
FIG. 15 is a block diagram showing the configuration of the RNN module.

In the RNN module 112 constructed as in FIG. 15, each sensor information detected by the robot apparatus 1 is supplied to the feature extraction module 113.

The feature extraction module 113 processes a variety of sensor information to extract a feature from the sensor information, thereby providing a sensor feature. Then, the feature extraction module 113 supplies the sensor feature to the RNN module 112.

The RNN module 112 functions as the learning unit 103 and prediction unit 104 having previously been described with reference to FIG. 2. Namely, it learns the information and predicts information on the basis of the learned information. For example, the RNN module 112 is constructed as shown in FIG. 15. Also, the RNN module 112 is composed of a control program as a learning module 72 shown in FIG. 10, for example.

The RNN module 112 constructed as shown in FIG. 12 is supplied with a command $A_t$ from the behavior program module 111 along with sensor information as an input. In the RNN module 112, the input sensor information and command $A_t$ are used to learn information by means of a forward module $112_1$ as the RNN and an inverse module $112_2$ as the inverse RNN.

For the learning in the RNN module 112, the forward module $112_1$ acquires sensor information (sensor predicted value) $S_{t+1}$ and context $C_{t+1}$ at the next time from the input sensor information $S_t$ and the like. The sensor information (sensor predicted value) $S_{t+1}$ and context $C_{t+1}$ at the next time, acquired by the RNN module 112, are stored into the behavior program module 111 in which they are stored in association with the internal state of the robot apparatus 1 as necessary, for example. It should be noted that the internal state is an emotion or the like, for example.

The behavior program module 111 is to decide a behavior program for the robot apparatus 1. The behavior program module 111 is formed as the behavior model library 70 shown in FIG. 10, for example. For learning (in the learning phase; namely, when no complete learning has yet been attained), the behavior program module 111 decides a behavior of the robot apparatus 1 on the basis of one desired one of the aforementioned behavior models $70_1$ to $70_n$ in the behavior model library 70. As shown in FIG. 14, the behavior program module 111 supplies the behavior information A corresponding to a behavior program to the posture management module 61. Then, the operation of the robot apparatus 1 is controlled on the basis of the behavior information $A_t$ through the operations of the modules laid downstream of the behavior program module 111.

Also, when it has become necessary to recall sensor information and context stored inside the behavior program module 111 when the learning in the RNN module 112 has progressed (that is, after some learning), the behavior program module 111 takes out sensor information S and context C to be recalled, and supplies them as an input to the forward model $112_2$ as the inverse RNN to the RNN module 112.

In the RNN module 112, time series $A_1, A_2, \ldots, A_n$ of an action to do (recall) are computed one after another from the input by the inverse RNN, and are sent to the posture management module 61. Thus, the robot apparatus 1 behaves so that a desired input to the behavior program module 111 can be provided.

As above, application a force directly to the robot apparatus 1 by the user can establish an intuitive interface between the user and robot apparatus 1, and repeated teaching of the same action permits the robot apparatus 1 to predict a due operation thereof and thus autonomously make that operation even if an instructive action for the operation is not fully made to the robot apparatus 1.

Note that in the aforementioned embodiment, after learning an action, the robot apparatus 1 can detect application of an external force similar to a one having been used during the learning and autonomously perform an action correspondingly to the learned one. However, the present invention is not limited to this embodiment but can be applied to implement a robot apparatus 1 which can autonomously do a learned action right from the beginning without taking any applied external force as a trigger signal. In this case, the robot apparatus 1 can associate an emotion or the like with a learned action and do the learned action when the robot apparatus 1 has the emotion associated with that action. For taking a posture, the robot apparatus 1 uses a learned forward model to solve the inverse dynamics in order to compute a to-be-outputted torque, and uses the torque to act for a goal posture.

In the aforementioned embodiment of the present invention, the learning unit uses the RNN and the prediction unit uses the inverse RNN. However, the present invention is not limited to this embodiment. Of course, the learning unit is not limited to such a neural network.

Also in the aforementioned embodiment, the present invention is applied to the robot apparatus 1 itself. However, the present invention is not limited to such a robot apparatus. For example, the present invention is applicable to a program to be executed by the aforementioned robot apparatus 1 and a medium having such a program recorded therein.

INDUSTRIAL APPLICABILITY

The robot apparatus-operation controlling method according to the present invention permits the robot apparatus to learn an action made by the user onto the moving part and autonomously make the learned action by recalling it on the basis of an external force applied to the moving part.

Under the program according to the present invention, the robot apparatus is enable to learn an action made by the user onto the moving part, and autonomously make the learned action by recalling it on the basis of an external force applied to the moving part. Also, the present invention provides a recording medium having the program recorded therein. In this case, the robot apparatus reads the program recorded in the recording medium to learn an action made by the user onto the moving part, and autonomously make the learned action by recalling it on the basis of an external force applied to the moving part.

The robot apparatus according to the present invention includes a learning means for learning time-series signals generated at the moving part when the latter is operated, and a motion controlling means for controlling the moving part on the basis of a signal generated at the moving part due to an external force applied to the moving part after the learning and the time-series signals learned by the learning means, and can thus learn an action made by the user onto the moving part and autonomously make the learned action by recalling it on the basis of the external force applied to the moving part.

What is claimed is:

1. A method of controlling the operation of a robot apparatus having a moving part, the method comprising steps of:
   learning a time-series signal generated at the moving part correspondingly to an operation of the moving part; and
   controlling the moving part according to the time-series signal learned in the learning step;
   whereby learning said time-series signal is performed in response to an external force applied to said moving part during a learning operation.

2. The method as set forth in claim 1, wherein the signal indicates a position of the moving part.

3. The method as set forth in claim 2, wherein:
   the robot apparatus includes means for detecting, when controlling the motion of the moving part, a position to which the moving part has moved; and
   the signal is a detection signal from the position detecting means.

4. The method as set forth in claim 1, wherein in the motion controlling step, a motion is predicted based on an initial signal generated, after the learning, at the moving part due to the external force applied to the moving part, the predicted value is compared with the time-series signal learned in the learning step, and the moving part is controlled on the result of the comparison.

5. The method as set forth in claim 1, wherein in the learning step, the time-series signal is learned by a neural network in which a signal is inputted toward an input layer, hidden layer and output layer.

6. The method as set forth in claim 5, wherein the neural network is a recurrent neural network having a loop for a feedback from the output layer toward the input layer.

7. A program for controlling the operation of a robot apparatus, the program allowing a robot apparatus to execute steps of:
   learning a time-series signal generated at the moving part correspondingly to an operation of the moving part; and
   controlling the moving part according to the time-series signal learned in the learning step;
   whereby learning said time-series signal is performed in response to an external force applied to said moving part during a learning operation.

8. A recording medium having recorded therein a program for controlling the operation of the robot apparatus having a moving part, the program allowing the robot apparatus to execute steps of:
   learning a time-series signal generated at the moving part correspondingly to an operation of the moving part; and
   controlling the moving part according to the time-series signal learned in the learning step;
   whereby learning said time-series signal is performed in response to an external force applied to said moving Part during a learning operation.

9. A robot apparatus having a moving part, comprising:
   means for learning a time-series signal generated at the moving part correspondingly to an operation of the moving part; and
   motion controlling means for controlling the moving part according the time-series signal learned in the learning step;
   whereby learning said time-series signal is performed in response to an external force applied to said moving part during a learning operation.

10. The apparatus as set forth in claim 9, wherein the signal indicates a position
of the moving part.

11. The apparatus as set forth in claim 10, wherein:
   the robot apparatus includes means for detecting, when controlling the motion of the moving part, a position to which the moving part has moved; and
   the signal is a detection signal from the position detecting means.

12. The apparatus as set forth in claim 9, further comprising means for predicting an action from an initial signal generated, after the learning, at the moving part due to the external force applied to the moving part;
   the motion controlling means comparing the predicted value from the predicting means and the time-series signal learned by the learning means with each other and controlling the moving part on the basis of the result of comparison.

13. The apparatus as set forth in claim 9, wherein the learning means learns the time-series signal by means of a neural network in which a signal is inputted toward an input layer, hidden layer and output layer.

14. The apparatus as set forth in claim 13, wherein the neural network is a recurrent neural network having a loop for a feedback from the output layer toward the input layer.

* * * * *